A. E. MICHAELSON.
PHOTOGRAPHIC MOTION RECORDING DEVICE.
APPLICATION FILED NOV. 13, 1917.

1,303,099.

Patented May 6, 1919.

Inventor:
Andrew E. Michaelson
by
Attorney.

UNITED STATES PATENT OFFICE.

ANDREW E. MICHAELSON, OF PORTLAND, OREGON.

PHOTOGRAPHIC MOTION-RECORDING DEVICE.

1,303,099. Specification of Letters Patent. Patented May 6, 1919.

Application filed November 13, 1917. Serial No. 205,479.

*To all whom it may concern:*

Be it known that I, ANDREW E. MICHAELSON, a citizen of the United States, and a resident of the city of Portland, county of Multnomah, State of Oregon, have invented a certain new and useful Improvement in Photographic Motion-Recording Devices, of which the following is a specification.

The object of my invention, briefly stated, may be said to consist in providing means for obtaining a permanent record, in a simple way, of the number of cycles of motion a moving body—the number of complete revolutions a revolving body—makes during a given time. My invention was particularly designed for registering the travel of a vehicle, although, as will be evident, it may be used to advantage for many other purposes.

It will suffice for me to describe how I attain my object for the purpose of recording the revolutions of a revolving body, as, for example, recording the travel of the wheel of the vehicle during a given time. For such purpose my device comprises a recording wheel, given relative rotation with respect to the vehicle wheel; the rim of the recording wheel is provided with an orifice through which a beam of light from a suitable artifical source is projected and a sensitized tape, preferably graduated with respect to time, is caused to travel at constant speed in front of said orifice, so as to have impinged upon itself said beam of light.

After my device has been working for a time, and it is desired to obtain the record which it has made, the tape is removed and developed, by which a permanent record will be produced of the number of flashes of light which were projected on the tape in the given time; and such record, of course, will serve to record whether the vehicle moved at all within any, or a certain, period of time, as well as the speed at which it traveled while in motion during divisions of the same period.

Figure 1:
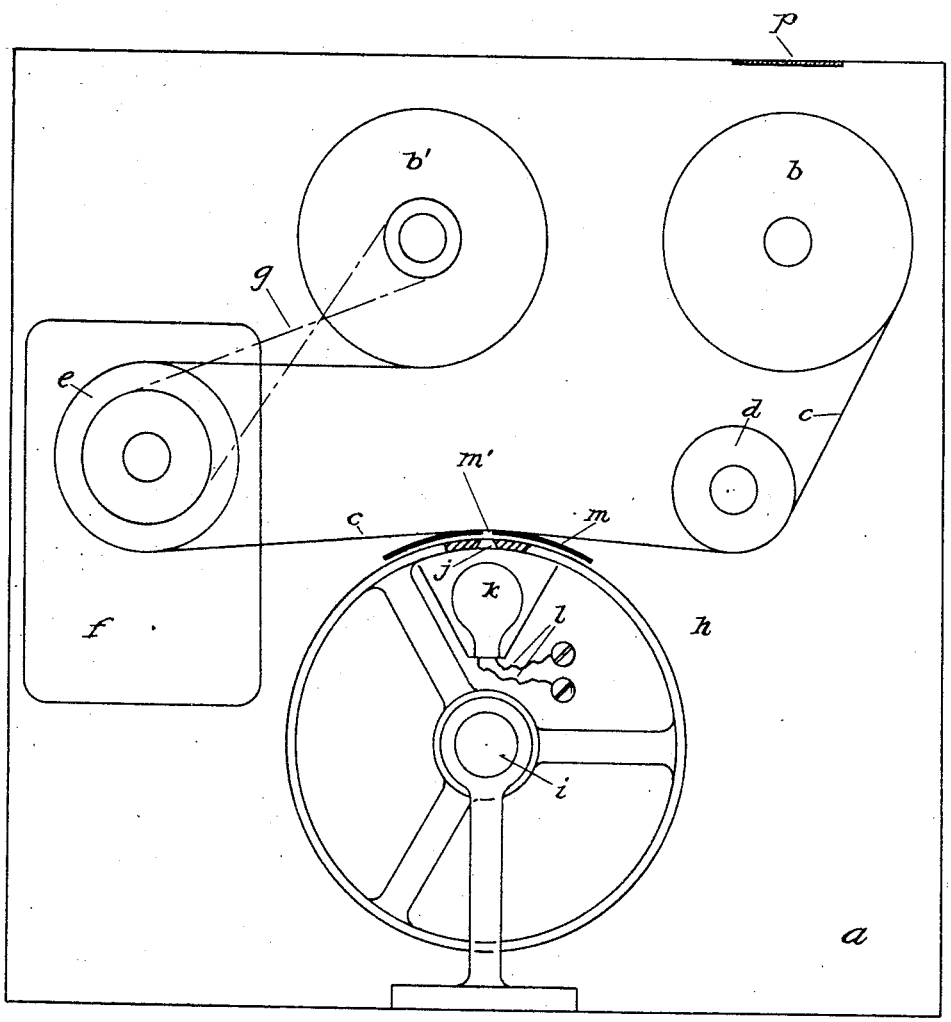
Figure 2:
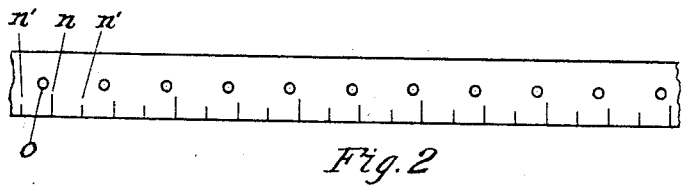

It will suffice to describe my means by the aid of diagrammatic figures, such as shown in the accompanying drawings, in which:

Figure 1 represents, diagrammatically, all the elements comprised within my recorder; and Fig. 2 illustrates a section of the sensitized tape provided with graduations representing time, and assumed to have been exposed in my recorder as hereinafter explained.

$a$ represents a light-proof case. $b$, $b'$ are revoluble spools. A sensitized tape $c$ is fastened at one end to the spool $b$, being thence conducted over a guide roller $d$ to and over a driven pulley $e$, by which the tape is given its motion; and it is finally wound on the spool $b'$. The driven pulley $e$ is rotated by a clockwork assumed to be contained in the case $f$ and to be adapted to move the tape $c$ at constant speed when the clockwork is set into motion. There is a driving connection $g$ between the clock-driven spool $e$, and the spool $b'$ is assumed to be driven at such speed as to wind up the out-going end of the tape $c$ in coöperation with the motion imparted to the tape by the clock-driven spool $e$. The details of communicating motion between the spools $e$ and $b'$ being immaterial, I have merely diagrammatically represented such means as including a cord ($g$) permitted some slip with regard to its connection with the spool $b'$ and adapted to revolve the latter at proper speed so as to wind up the tape end as it passes the spool.

The wheel $h$ is fast on a shaft $i$ which is assumed to have proper connection with the vehicle wheel so as to impart to it relative rotation, as obvious, by recording the number of complete revolutions of the wheel $h$ within a given period of time, the fact whether the vehicle did travel, and also the speed at which it traveled during such time is recorded. In order to obtain such record, I provide the rim of the wheel $h$ with an orifice $j$, through which to pass a beam of light from the lamp $k$, which is assumed to be an electric lamp connected with the proper source of energy, through the terminal wires $l$ and their connections. $m$ represents a screen which is assumed to inclose substantially light-proof the rim of the wheel $h$, and has an orifice $m'$ through which the beam of light is permitted to impinge upon the tape $c$. The latter has a photographically sensitized surface, and is provided with graduations, as, for example, $n$, $n'$, representing half-hours and hours.

In the diagrammatic view, Fig. 2, the disks $o$ represent spots produced on the sensitized surface of the tape by the beams of light projected through the orifices $j$, $m'$ in the course of the tape's travel during successive periods of time.

When my recorder has operated for such length of time as to have unwound the tape $c$ from the spool $b$, and wound the same on the spool $b'$, which fact may be observed through an observation orifice covered by colored glass located as at $p$, the spools may be taken out and a new spool of tape inserted, in similar manner as in a photographic camera; and the tape is then to be developed, and will produce the record desired.

Instead of using a tape graduated with respect to time, an ungraduated tape may be used, and the device for moving the same adapted to cause its travel a certain distance within a given time, as, for instance, an inch per hour, whereupon an ordinary foot-rule could later be used for ascertaining the travel of the moving body, and its speed during a certain interval. The graduations on the tape are merely suggested for convenience.

I claim:

An apparatus of the character specified comprising a substantially light-proof case, an annular member, rotatable therein, having a light-passing orifice in its rim and being driven relatively to the body of which the travel is to be recorded, a source of light within the annular member and adapted to project a beam through said orifice, spools in the case winding and unwinding a sensitized tape, and clock works adapted for moving the tape at a certain rate during intervals of time; said tape moving in front of said orifice of said annular member.

ANDREW E. MICHAELSON.

Copies of this patent may be obtained for five cents each, by addressing the "Commissioner of Patents, Washington, D. C."